United States Patent
Kim et al.

(10) Patent No.: US 7,519,764 B2
(45) Date of Patent: Apr. 14, 2009

(54) APPARATUS AND METHOD FOR DETECTING DATA VALIDITY IN FLASH MEMORY

(75) Inventors: Jin-kyu Kim, Seoul (KR); Song-ho Yoon, Bucheon-si (KR); Kwang-yoon Lee, Seongnam-si (KR); Ji-hyun In, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 11/229,696

(22) Filed: Sep. 20, 2005

(65) Prior Publication Data
US 2006/0085623 A1    Apr. 20, 2006

(30) Foreign Application Priority Data
Oct. 18, 2004    (KR) .................... 10-2004-0083209

(51) Int. Cl.
*G06F 12/16*    (2006.01)
(52) U.S. Cl. .................... 711/103; 711/156; 711/202
(58) Field of Classification Search ........................ None
See application file for complete search history.

(56) References Cited

U.S. PATENT DOCUMENTS

| 4,980,888 | A | * | 12/1990 | Bruce et al. ............... 714/718 |
| 5,617,348 | A | * | 4/1997 | Maguire ..................... 365/49 |
| 5,630,093 | A | * | 5/1997 | Holzhammer et al. ........ 711/115 |
| 5,925,141 | A | * | 7/1999 | Ariki ........................... 714/718 |
| 2003/0099134 | A1 | | 5/2003 | Lasser et al. |
| 2005/0013154 | A1 | * | 1/2005 | Honda et al. ................ 365/145 |

FOREIGN PATENT DOCUMENTS

| CN | 1480953 A | 3/2004 |
| JP | 63298602 | 12/1988 |
| JP | 7-182886 A | 7/1995 |
| JP | 2000067588 | 3/2000 |
| KR | 2000-0011610 A | 2/2000 |
| KR | 10-2005-0040120 A | 5/2005 |

* cited by examiner

*Primary Examiner*—Than Nguyen
(74) *Attorney, Agent, or Firm*—Sughrue Mion, PLLC

(57) ABSTRACT

A data processing apparatus and method are provided for a flash memory, wherein the data processing apparatus and method can easily determine whether data stored in the flash memory is valid. The data processing apparatus for a flash memory includes a user request unit which issues a request for performing a data operation on a predetermined logical address, a conversion unit which converts the predetermined logical address into a physical address, and a control unit which performs the data operation on the physical address and records inverted data of data written to the predetermined logical address in an index area to indicate whether the data written to the predetermined logical address is valid.

10 Claims, 13 Drawing Sheets

FIG. 10 under normalization US 7,519,764 B2

APPARATUS AND METHOD FOR DETECTING DATA VALIDITY IN FLASH MEMORY

CROSS-REFERENCE TO RELATED APPLICATION

This application claims priority from Korean Patent Application No. 10-2004-0083209 filed on Oct. 18, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to data processing for a flash memory, and more particularly, to data processing for a flash memory, which can easily determine whether data stored in the flash memory is valid.

2. Description of the Related Art

In general, home appliances, communications devices, and embedded systems, such as set-top boxes, use non-volatile memories as storage devices for storing and processing data.

Flash memories are one type of non-volatile memory, in which data can be electrically erased and overwritten. Flash memories are suitable for portable devices because they consume less power than magnetic disk memory-based storage mediums, are as accessible as hard disks, and are compact-sized.

Due to the hardware characteristics of flash memories, data recorded on a flash memory should be erased before data is overwritten on the flash memory.

A unit in which data is recorded on a flash memory may differ from a unit in which data is erased from the flash memory, which may result in deterioration of the performance of the flash memory.

In order to prevent the performance of the flash memory from deteriorating for this reason, logical addresses and physical addresses have been suggested.

Here, logical addresses are virtual addresses specified by a user when executing a data operation on the flash memory with the use of a program. By comparison, physical addresses are actual addresses referenced when executing the data operation on the flash memory.

Flash memory is generally classified into either a small block flash memory or a large block flash memory. In a small block flash memory, a logical operation unit is equal to a physical operation unit, whereas in a large block flash memory, a logical operation unit is smaller than a physical operation unit.

Figure 1A:
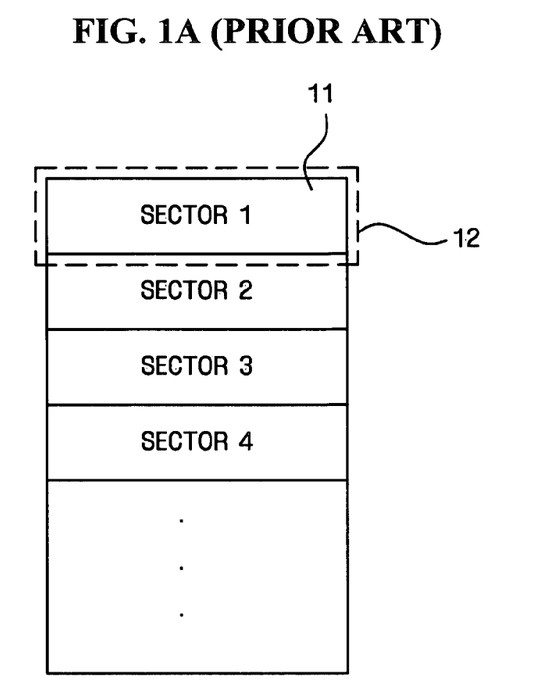
FIG. 1A is a diagram illustrating the format of a typical small-block flash memory.
Figure 1B:
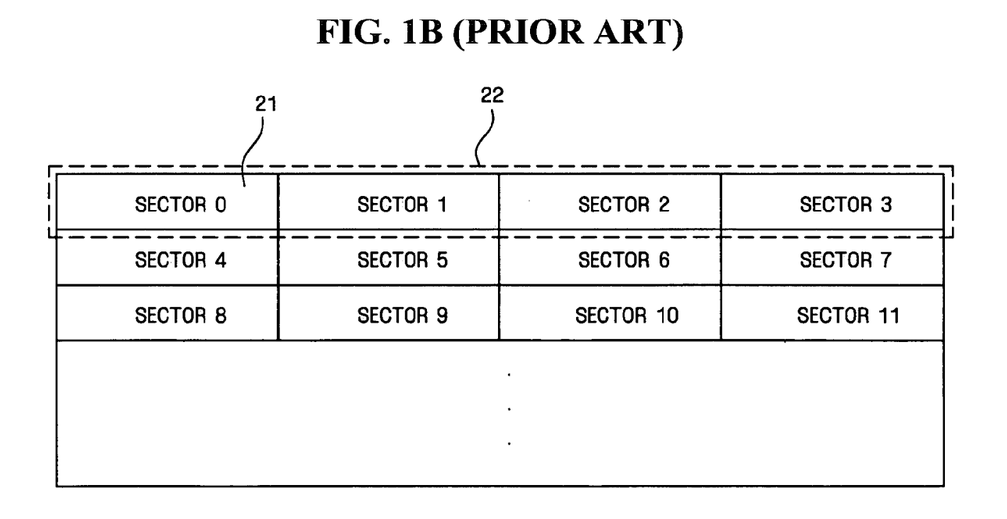
FIG. 1B is a diagram illustrating the format of a typical large-block flash memory.

FIGS. 1A and 1B are schematic diagrams illustrating a small block flash memory and a large block flash memory, respectively.

Referring to FIG. 1A, logical computations of the small block flash memory are performed in units of a sector 11, and physical computations of the small block flash memory are performed in units of a page 12, which is as large as sector 11.

Meanwhile, as shown in FIG. 1B, logical computations of the large block flash memory are performed in units of a sector 21, and physical computations of the large block flash memory are performed in units of a page 22, which is comprised of at least one sector 21.

A flash memory-based system may unexpectedly suffer from frequent power interruptions due to its characteristics. Therefore, the flash memory-based system needs a function of recovering data which is damaged or lost due to a power interruption.

Data write and erase operations for a flash memory will now be described in detail. If power is cut off in the process of writing data to a flash memory, only part of the data is successfully written to the flash memory. If power is cut off in the process of erasing data from a flash memory, only part of the data is successfully erased from the flash memory.

Therefore, a variety of methods of determining whether data stored in a flash memory is valid if power is cut off in the process of performing a data operation, such as a write operation or an erase operation, on the flash memory have been suggested.

Figure 2:
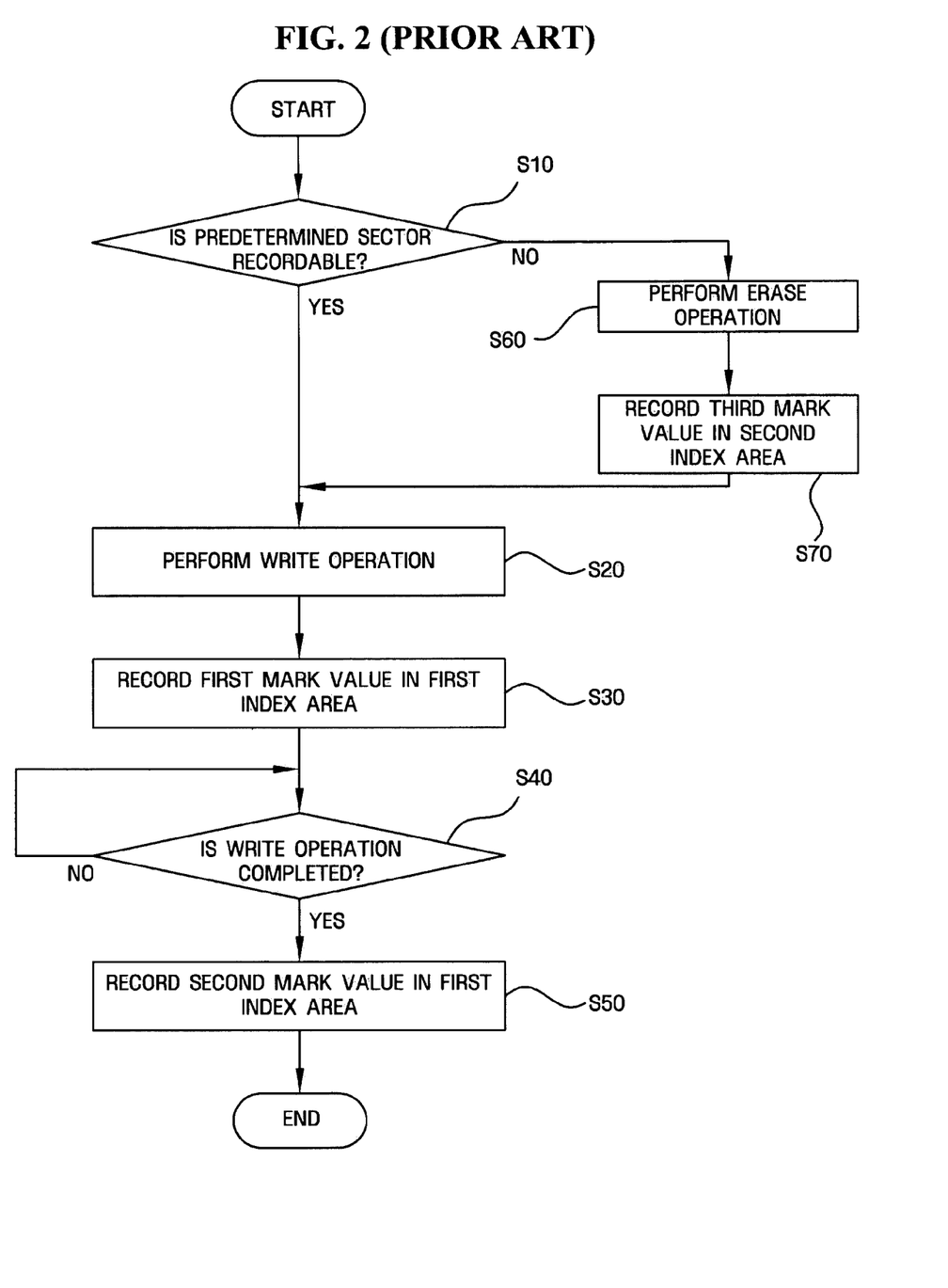
FIG. 2 is a flowchart illustrating a conventional method of writing data to a flash memory.

FIG. 2 is a flowchart illustrating a conventional method of writing data to a flash memory.

Referring to FIG. 2, in operation S10, it is determined whether a predetermined sector of a flash memory is a recordable sector. In other words, it is determined whether data has already been written to the predetermined sector of the flash memory, the result of which is later used to decide whether to perform a write operation or an erase operation.

If the predetermined sector of the flash memory is determined to be a recordable sector in operation S10, a write operation is performed on the predetermined sector of the flash memory, in operation S20. In operation S30, a first mark value is recorded in a predetermined index area corresponding to the predetermined sector of the flash memory.

Figure 3:
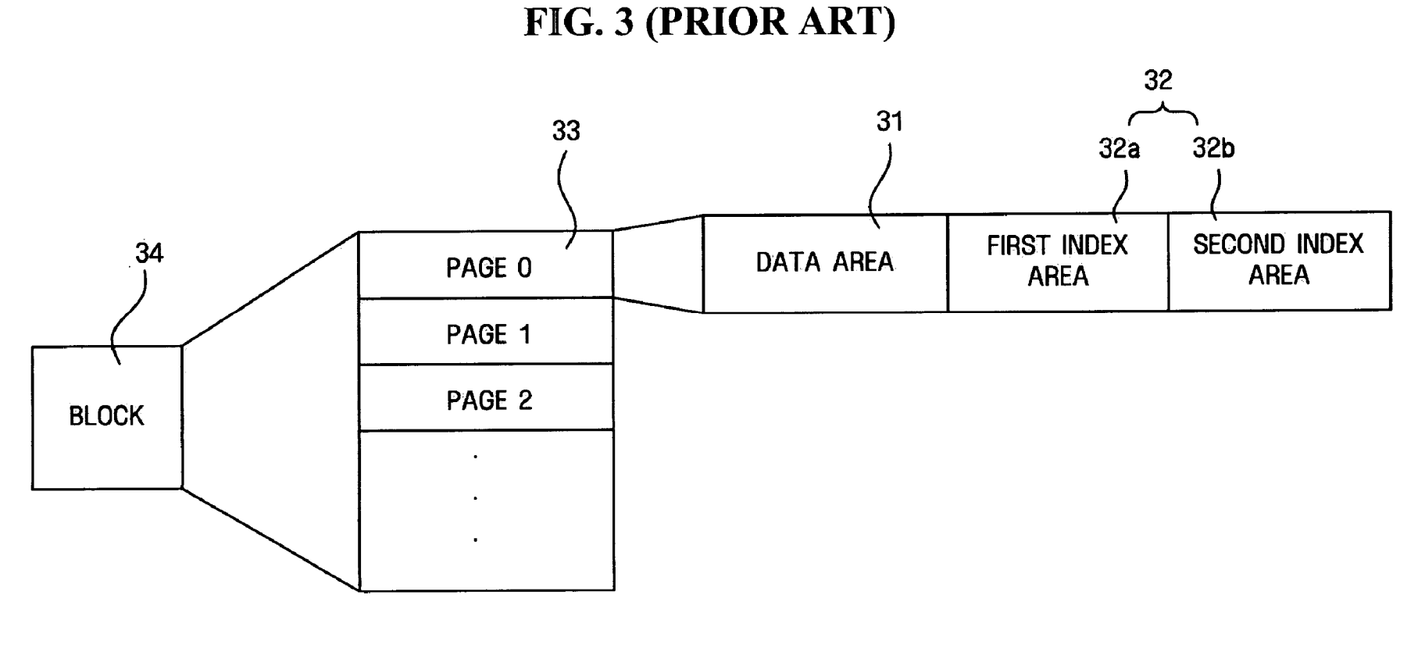
FIG. 3 is a diagram illustrating the format of a typical flash memory comprising a data area and an index area.

In detail, as shown in FIG. 3, a block 34 of a flash memory comprises a plurality of pages 33, and each of the pages 33 comprises a data area 31 and an index area 32. The index area 32 comprises a first index area 32a, which indicates how much of a write operation currently being performed on the flash memory has been completed and a second index area 32b, which indicates how much of an erase operation currently being performed on the flash memory has been completed. The first mark value may be recorded in the first index area 32a while a write operation is performed on the data area 31.

Figure 4:
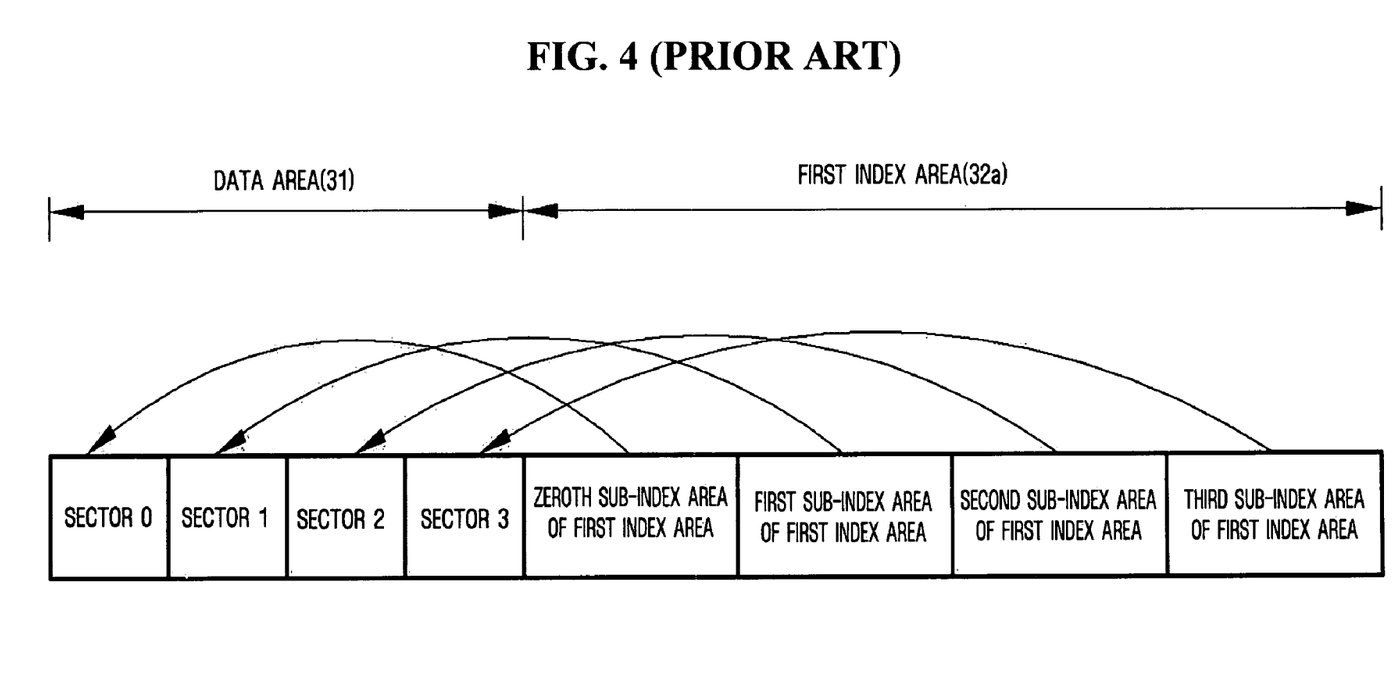
FIG. 4 is a diagram illustrating the format of a typical flash memory in which an index area comprises a plurality of sub-index areas for the respective sectors included in a data area.

In a case where the data area 31 comprises a plurality of sectors as illustrated in FIG. 4, the first index area 32a comprises as many first sub-index areas as the number of sectors constituting the data area 31. On the other hand, the second index area 32b, unlike the first index area 32a, corresponds to a block instead of a sector.

If the write operation is completed in operation S40, a second mark value is recorded in the first index area 32a to indicate that the write operation is completed in operation S50.

For example, when a write operation begins, a first mark value of 0xF0 is recorded in the first index area 32a. When the write operation ends, a second mark value of 0x00 is recorded in the first index area 32a.

If the predetermined sector of the flash memory is determined not to be a recordable sector in operation S10, an erase operation is performed on the predetermined sector of the flash memory in operation S60. In operation S70, a third mark value is recorded in the second index area 32b to indicate that the erase operation is completed. The third mark value may be identical to the second mark value recorded in the first index area 32a, i.e., 0x00.

If an initial value of, for example, 0xFF is recorded in both the first index area 32a and the second index area 32b, the predetermined sector of the flash memory may be determined to be a recordable sector in operation S10. Alternatively, if an initial value of 0xFF is recorded in the data area 31, the predetermined sector of the flash memory may be determined to be a recordable sector in operation S10. In detail, in a case where an erase operation is performed on the predetermined sector of the flash memory, all of the bits of the mark values recorded in the first index area 32a and the second index area 32b are changed to a logic value of 1. In this case, the predetermined sector of the flash memory may be determined to be a recordable sector if an initial value of 0xFF is recorded in the data area 31.

Figure 5:
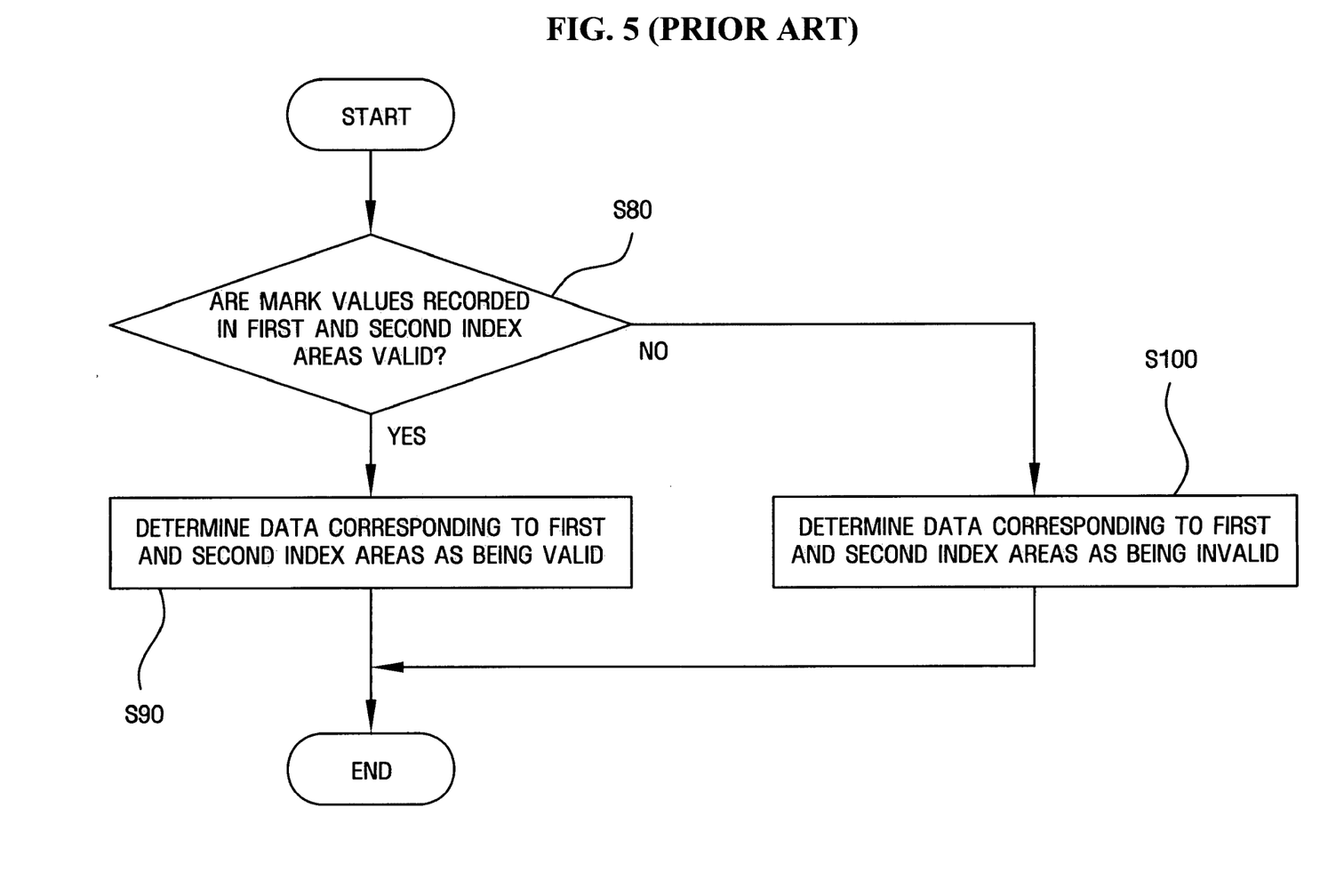
FIG. 5 is a flowchart illustrating a conventional method of determining whether data stored in a flash memory is valid.

FIG. 5 is a flowchart illustrating a conventional method of determining whether data written to a flash memory using the method as illustrated in FIG. 2 is valid.

Referring to FIG. 5, in operation S80, it is determined whether a second mark value and a third mark value recorded in the first index area 32a and the second index area 32b, respectively, are valid.

In detail, if 0x00 is recorded in the first index area 32a and the second index area 32b as the second mark value and the third mark value, the second and third mark values are determined to be valid.

If the second and third mark values are determined to be valid, the data recorded in a sector corresponding to the first and second index areas 32a and 32b is determined to be valid in operation S90. If the second and third mark values are determined not to be valid, the data recorded in the sector corresponding to the first and second index areas 32a and 32b is determined to be invalid in operation S100.

In the conventional method as illustrated in FIG. 5, it is necessary to record a first mark value and a second mark value in the first index area 32a in the process of writing data to the data area 31. However, the recording of the first and second mark values in the first index area 32a may deteriorate the performance of a flash memory.

Figure 6A:
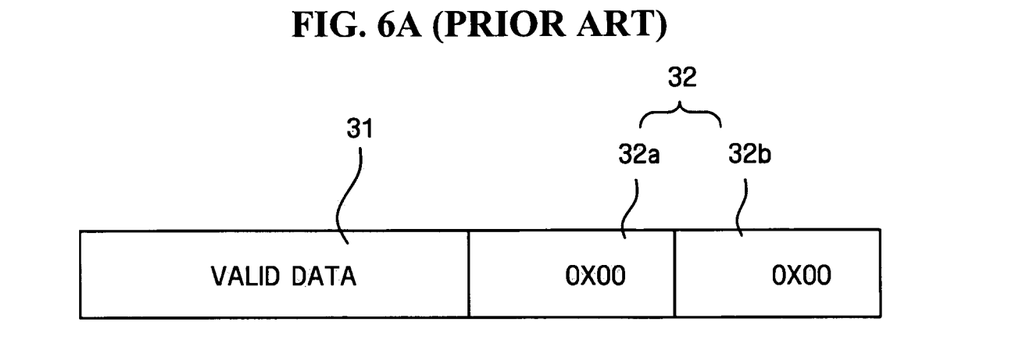
FIG. 6A is a diagram illustrating a data area in which valid data is stored and an index area.
Figure 6B:
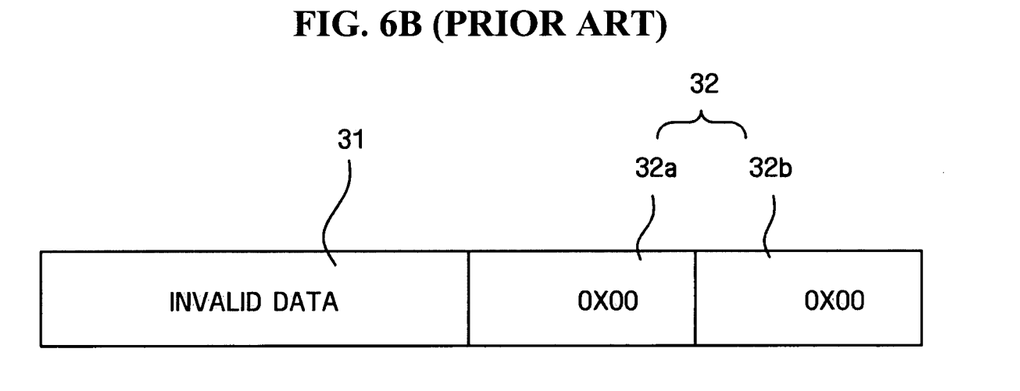
FIG. 6B is a diagram illustrating a data area in which invalid data is stored and an index area.

In addition, if power is cut off in the process of performing an erase operation on the flash memory, data stored in the data area 31 may be successfully erased, but the mark values stored in the first and second index areas 32a and 32b may not be erased. In this case, the data stored in the data area 31 may be mistakenly determined to be valid because of the mark values still stored in the first and second index areas 32a and 32b. In other words, if power is cut off in the process of performing an erase operation on the data area 31 as illustrated in FIG. 6A, data stored in the data area 31 becomes invalid as illustrated in FIG. 6B, but mark values (0x00) stored in the first and second index areas 32a and 32b still indicate that the data stored in the data area 31 is valid. Thus, the data stored in the data area 31 may be mistakenly determined to be valid because of the mark values recorded in the first and second index areas 32a and 32b.

Korean Patent Laid-Open Publication No. 2005-0040120 discloses a method of writing data to a flash-type memory of an electronic module, which includes: associating at least two physical areas of the flash-type memory, which are called mirror areas, with a logical area; and programming data written to the logical area in one of the mirror areas while performing a write operation on the logical area. This method is useful for optimizing the time required to write data to a memory. However, in this method, it is difficult to determine whether data written to a memory is valid especially when an unexpected event, such as the power being cut off from the memory in the process of performing a data operation on the memory, occurs.

SUMMARY OF THE INVENTION

The present invention provides a data processing apparatus and method for a flash memory, which can easily determine whether data stored in the flash memory is valid when power is cut off in the process of performing a predetermined data operation on the flash memory.

According to an aspect of the present invention, there is provided a data processing apparatus for a flash memory including a user request unit which issues a request for performing a data operation on a predetermined logical address, a conversion unit which converts the predetermined logical address into a physical address, and a control unit which performs the data operation on the physical address and records inverted data of data written to the predetermined logical address in an index area to indicate whether the data written to the predetermined logical address is valid.

According to another aspect of the present invention, there is provided a data processing apparatus for a flash memory including an extraction unit which extracts data from a predetermined logical address and extracts data from an index area corresponding to the predetermined logical address, the data from the index area indicating whether the data extracted from the predetermined logical address is valid, and a control unit which determines whether the data extracted from the predetermined logical address is valid based on a relationship between the data extracted from the predetermined logical address and the data extracted from the index area.

According to still another aspect of the present invention, there is provided a data processing method for a flash memory including issuing a request for performing a data operation at a predetermined logical address, converting the predetermined logical address into a physical address, and performing the data operation at the physical address and recording inverted data of data written to the predetermined logical address in an index area to indicate whether the data written to the predetermined logical address is valid.

According to yet another aspect of the present invention, there is provided a data processing method for a flash memory including extracting data from a predetermined logical address and extracting data from an index area corresponding to the predetermined logical address, the data from the index area indicating whether the data extracted from the predetermined logical address is valid, and determining whether the data extracted from the predetermined logical address is valid based on a relationship between the data extracted from the predetermined logical address and the data extracted from the index area.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS THE INVENTION

The present invention may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

A flash memory is generally classified into a small-block flash memory and a large-block flash memory.

Whereas the small-block flash memory has a logical operation unit and a physical operation unit of the same size, the large-block flash memory has a physical operation unit having a size which is larger than that of a logical operation unit.

Here, the logical operation unit, which is a data operation unit used by a user through a user's program, is generally called a sector, and the physical operation unit, which is a data operation unit used in the flash memory, is generally called a page.

Here, sizes of the logical and physical operation units may vary according to the type of an apparatus employing the flash memory irrespective of the sector or page.

In this case, a data operation is performed at each logical address of the flash memory, and after each data operation is finished, a mark value is recorded in a corresponding index area.

In general, when data is written to a sector, a predetermined mark value is recorded more than one time in an index area corresponding to the sector in order to facilitate the determining of whether the data written to the sector is valid. The recording of the predetermined mark value more than one time, however, may deteriorate the performance of a flash memory and also make it difficult to precisely determine whether data written to the flash memory is valid.

Therefore, in the present invention, a data processing apparatus for a flash memory, which can minimize the number of operations performed on the flash memory for determining whether data written to the flash memory is valid and can easily determine whether data written to each of a plurality of logical addresses of the flash memory is valid, is provided.

Figure 7:
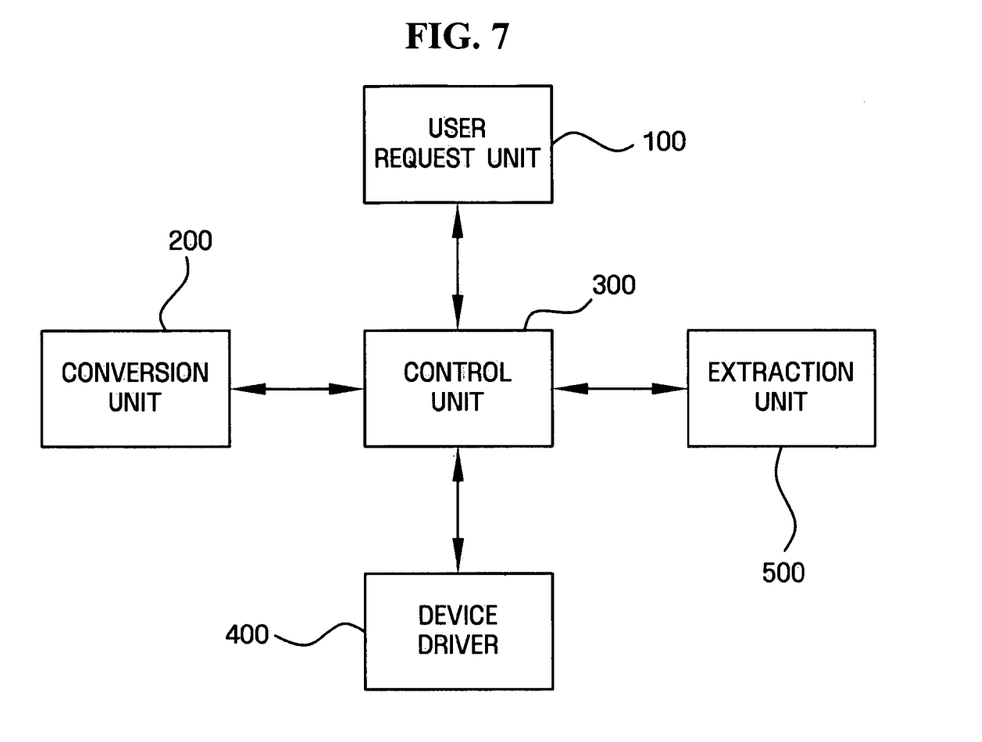
FIG. 7 is a block diagram of a data processing apparatus for a flash memory according to an exemplary embodiment of the present invention.

FIG. 7 is a block diagram of a data processing apparatus for a flash memory according to an exemplary embodiment of the present invention.

Referring to FIG. 7, the data processing apparatus includes: a user request unit 100 which allows a user to issue a request for performing a data operation on a flash memory with the use of a predetermined logical address; a conversion unit 200 which converts the predetermined logical address into a physical address; a device driver 400 which controls the operation of the flash memory using the physical address output by the conversion unit 200; and a control unit 300 which performs a predetermined data operation on the predetermined logical address of the flash memory using the device driver 400 and writes inverted data of data written to the predetermined logical address to an index area. The data processing apparatus may also include an extraction unit 500 which extracts the inverted data from the index area.

In this case, the control unit 300 may determine whether the data written to the predetermined logical address is valid by comparing the data written to the predetermined logical address with the inverted data extracted by the extraction unit 500.

Here, the inverted data is obtained by converting the data written to the predetermined logical address using a predetermined conversion approach. The predetermined conversion approach may be, for example, a 1s complement conversion approach, but the present invention is not restricted to it. In other words, the inverted data may be obtained using a 2s complement conversion approach.

In short, the control unit 300 writes data to the predetermined logical address upon the request of the user. Thereafter, the control unit 300 generates inverted data of the data written to the predetermined logical address and records the inverted data in the index area corresponding to the predetermined logical address.

Figure 8:
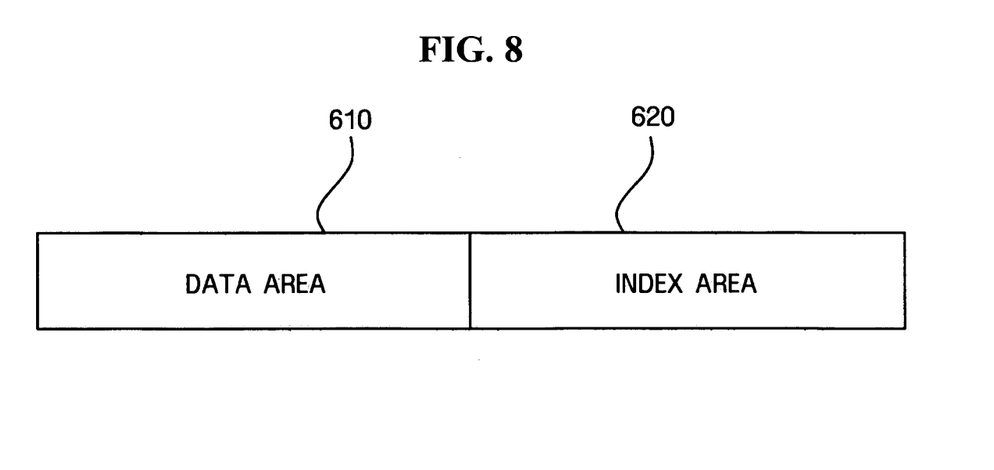
FIG. 8 is a diagram illustrating a data area and an index area according to an exemplary embodiment of the present invention.

In detail, referring to FIG. 8, a flash memory according to an exemplary embodiment of the present invention includes a data area 610 which comprises at least one logical address and on which a data operation is performed, and an index area 620 in which inverted data of data written to each of the logical addresses is recorded.

Figure 9A:
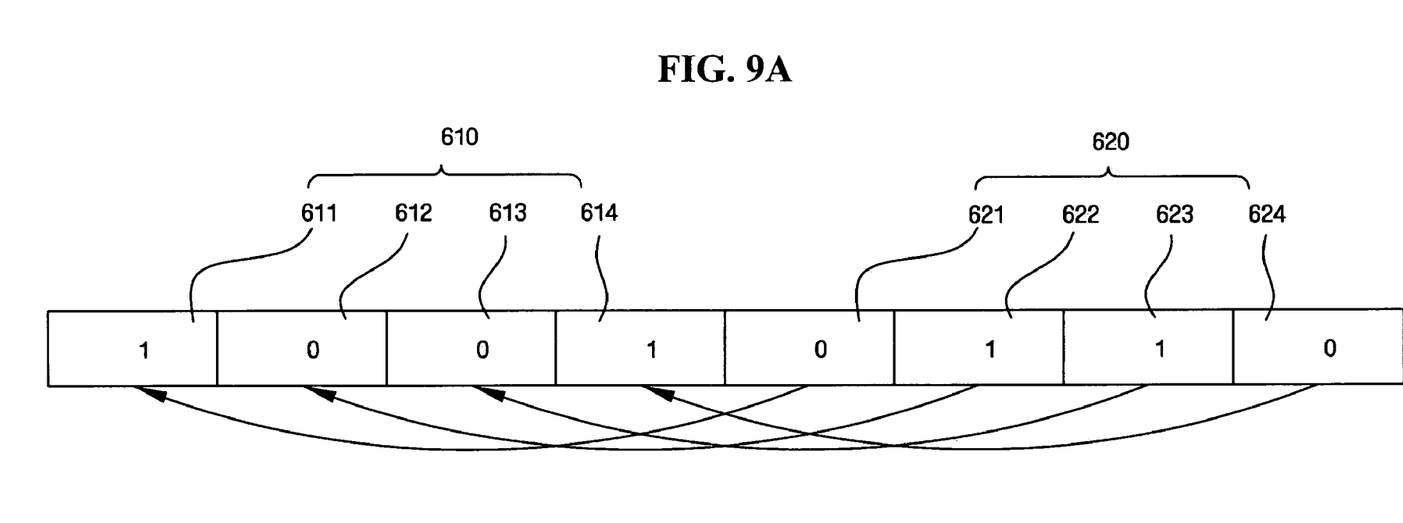
FIGS. 9A and 9B are diagrams illustrating the formats of index areas according to exemplary embodiments of the present invention, which indicate whether data written to their respective data areas is valid.

The index area 620 may be divided into a plurality of sub-index areas corresponding to the respective logical addresses of the data area 610 as illustrated in FIG. 9A.

Referring to FIG. 9A, the data area 610 comprises zeroth, first, second, and third logical addresses 611, 612, 613, and 614, and logic values of 1, 0, 0, and 1 are recorded at the zeroth, first, second, and third logical addresses 611, 612, 613, and 614, respectively.

The index area 620 is divided into zeroth, first, second, and third sub-index areas 621, 622, 623, and 624 in which inverted data of the data recorded at the zeroth, first, second, and third logical addresses 611, 612, 613, and 614, i.e., logic values of 0, 1, 1, and 0, is respectively recorded.

Figure 9B:
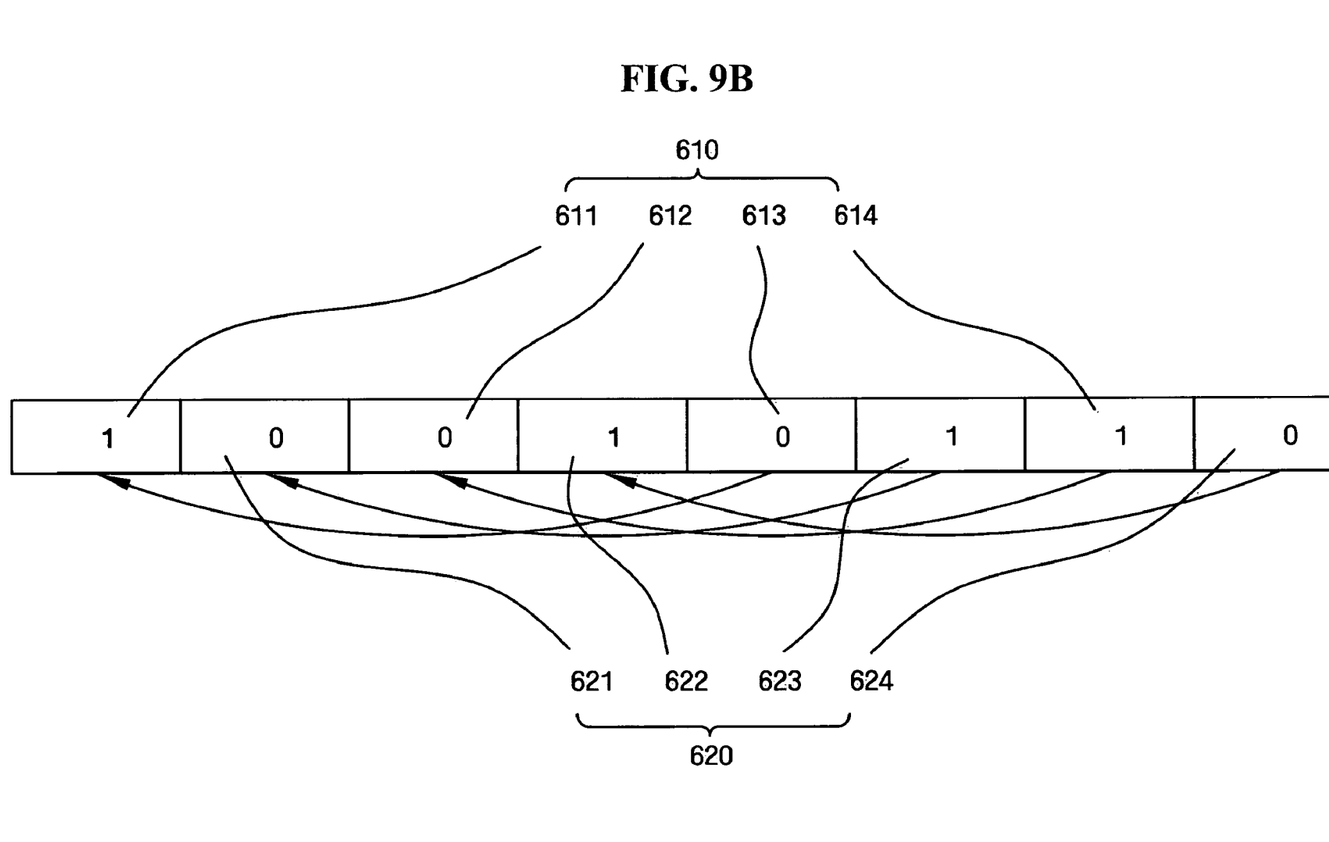

Alternatively, referring to FIG. 9B, a flash memory may comprise a plurality of logical address-sub-index area pairs 611 and 621, 612 and 622, 613 and 623, and 614 and 624; the logical addresses 611, 612, 613, and 614 may constitute a data area 610, and the sub-index areas 621, 622, 623, and 624 may constitute an index area 620.

The control unit 300 may determine whether data written to the logical addresses 611 through 614 of the data area 610 is valid by comparing the data written to the logical addresses 611 through 614 of the data area 610 with inverted data extracted from the respective index areas 621 through 624 by the extraction unit 500. For example, assume that a logic value of 1 is recorded at the first logical address 611 and a logic value of 0 is recorded in the first index area 621 in the process of performing a write operation on the first logical address 611.

In this case, even if the write operation is not completed because of an abrupt power cutoff, the control unit 300 may determine the data written to the first logical address 611 to be valid because inverted data of the data written to the first logical address 611 is recorded in the first index area 621.

However, if the data written to the first index area 621 is not the inverted data of the data written to the first logical address 611, the control unit 300 may determine the data written to the first logical address 611 to be invalid.

The operation of the data processing apparatus as illustrated in FIG. 7 will now be described in further detail.

Figure 10:
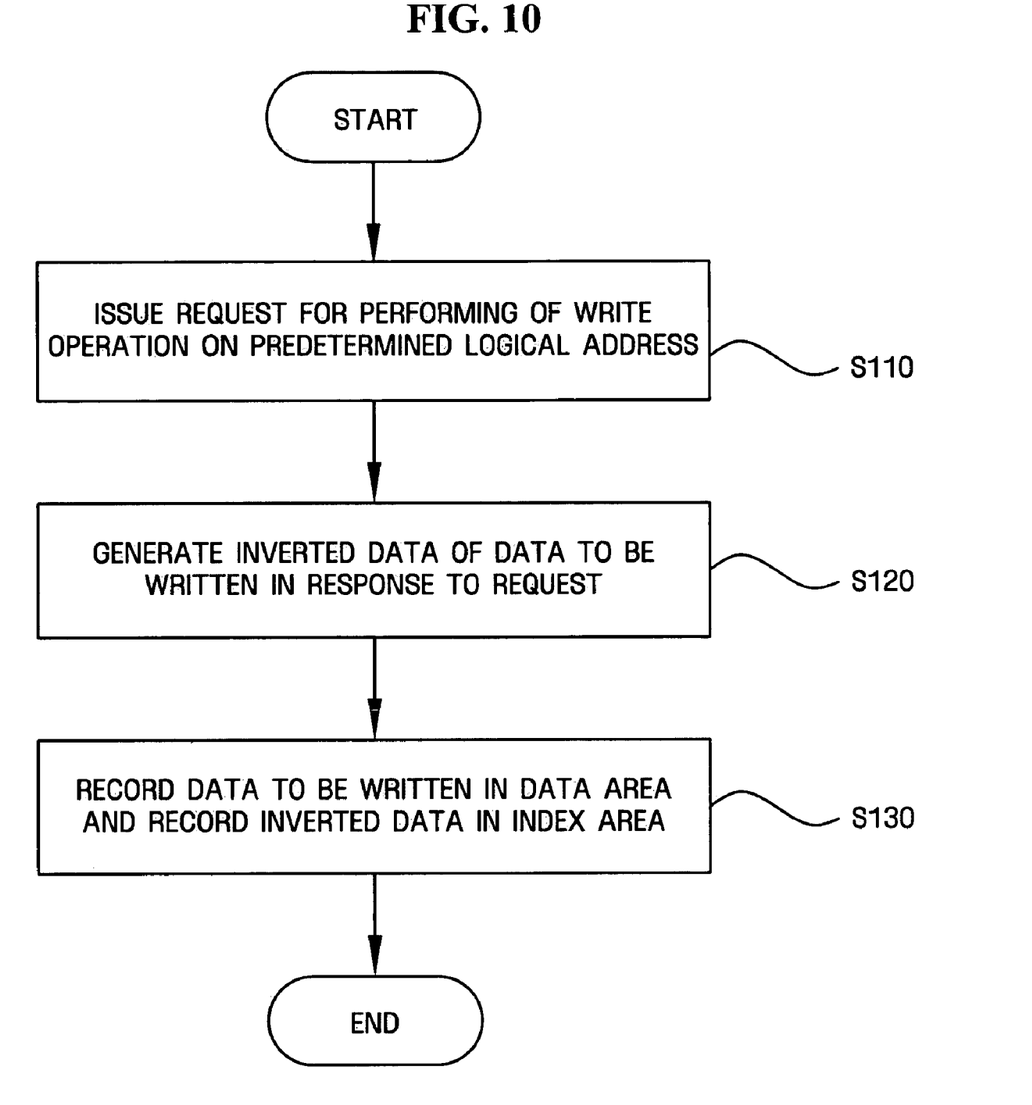
FIG. 10 is a flowchart illustrating a method of writing data to a flash memory according to an exemplary embodiment of the present invention.

FIG. 10 is a flowchart illustrating a method of writing data to a flash memory according to an exemplary embodiment of the present invention.

Referring to FIG. 10, in operation S110, a user issues a request for performing a write operation at a predetermined logical address using the user request unit 100.

In operation S120, the control unit 300 generates inverted data of data to be written upon the request of the user.

In operation S130, the control unit 300 writes the data to be written and the inverted data to the data area 610 and the index area 620, respectively.

Figure 11:
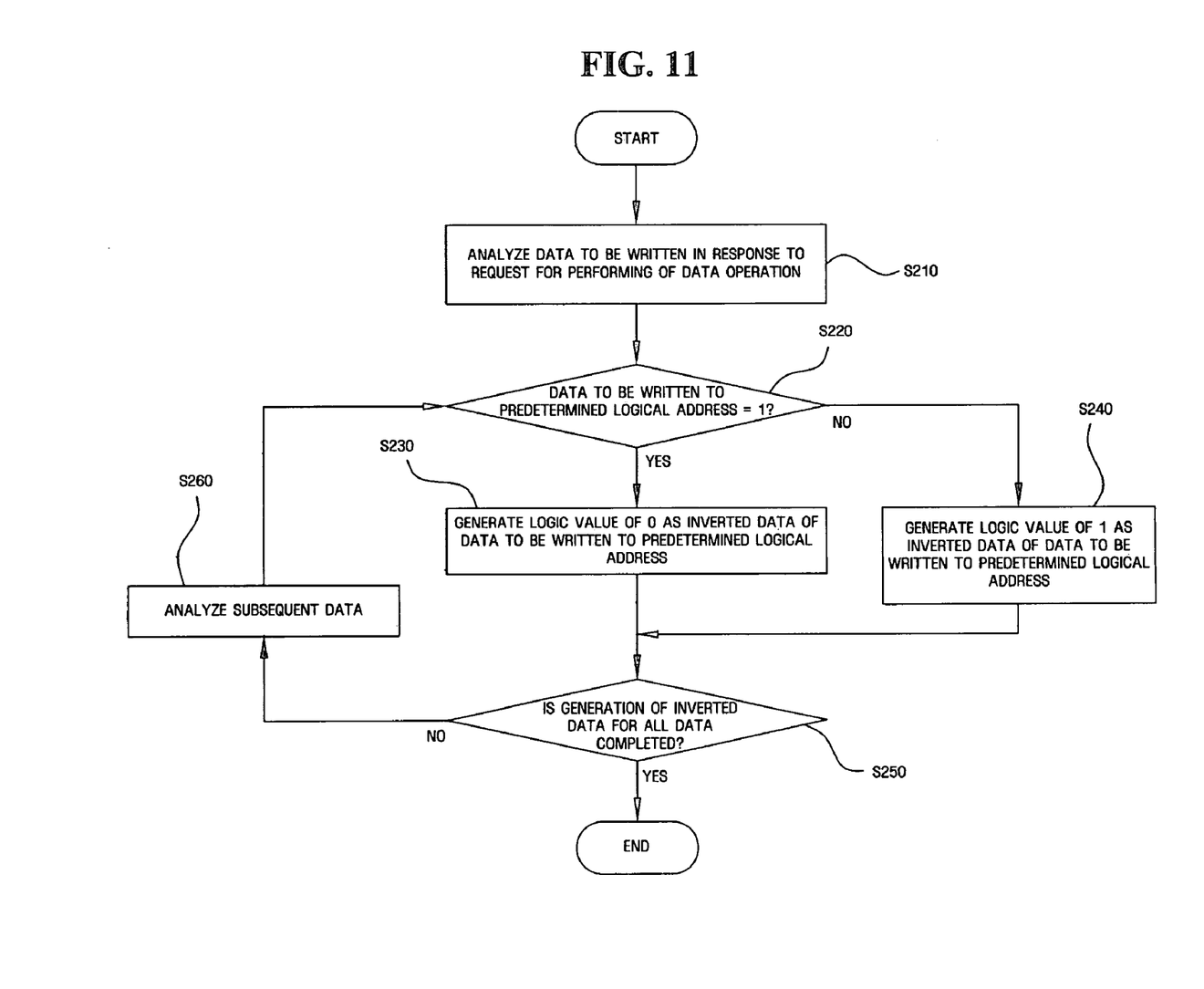
FIG. 11 is a flowchart illustrating a method of generating inverted data of data written to a data area of a flash memory according to an exemplary embodiment of the present invention.

FIG. 11 is a flowchart illustrating a method of generating inverted data performed by the control unit 300 of FIG. 7.

Referring to FIG. 11, in operation S210, data to be written is analyzed in response to a request for performing a write operation issued by the user request unit 100.

In detail, in operation S210, it is determined whether data to be written to a predetermined logical address is a logic value of 1 or 0.

If the data to be written to the predetermined logical address is determined to be a logic value of 1 in operation S220, the control unit 300 generates a logic value of 0 as inverted data of the data to be written to the predetermined logical address in operation S230. On the other hand, if the data to be written to the predetermined logical address is determined to be a logic value of 0 in operation S220, the control unit 300 generates a logic value of 1 as the inverted data of the data to be written to the predetermined logical address in operation S240.

In operation S250, it is determined whether the generation of inverted data for all of the data to be written is completed.

If the generation of inverted data for all of the data to be written is not completed, subsequent data to be written is analyzed in operation S260, and the method returns to operation S220 so that operations S220 through 240 are repeated until the generation of inverted data for all of the data to be written is completed.

Figure 12:
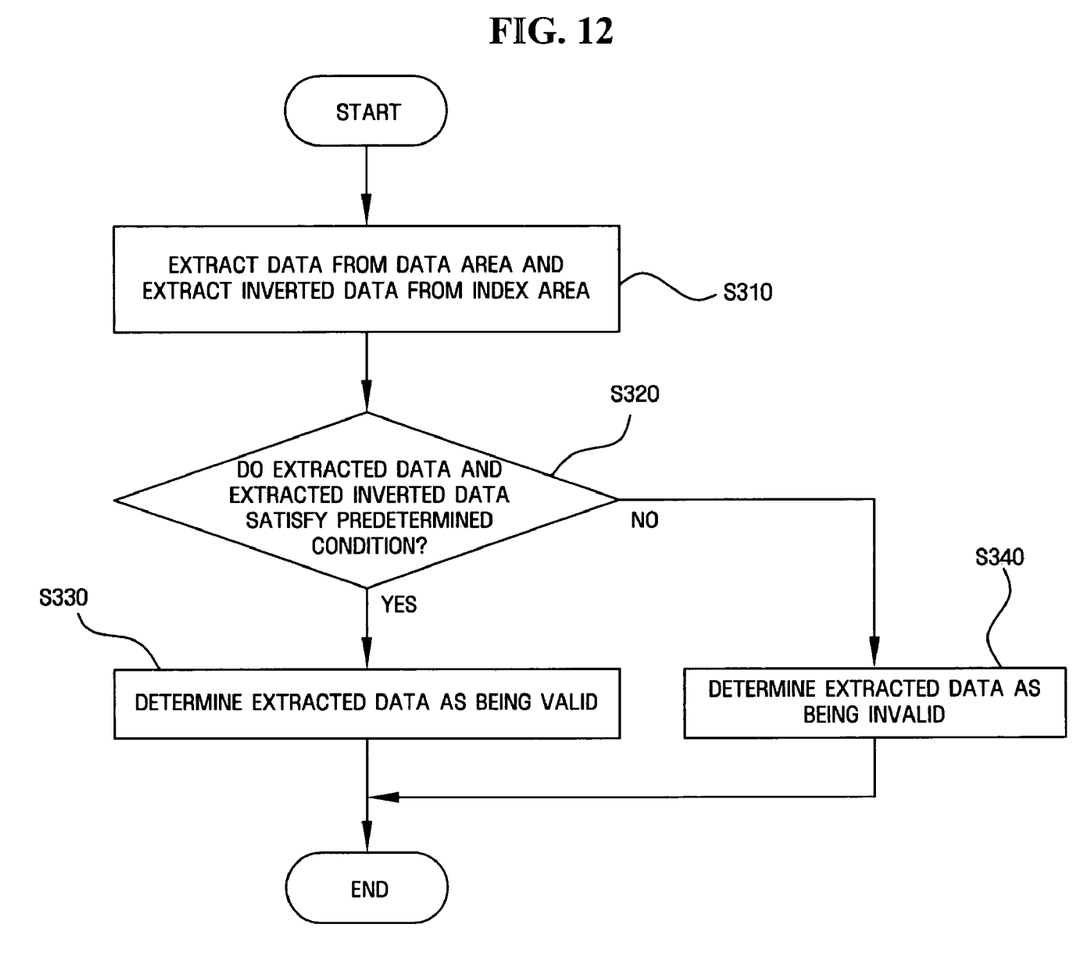
FIG. 12 is a flowchart illustrating a method of determining whether data written to a flash memory is valid according to an exemplary embodiment of the present invention.

FIG. 12 is a flowchart illustrating a method of determining whether data written to a flash memory in the method as illustrated in FIG. 11 is valid.

Referring to FIG. 12, in operation S310, the extraction unit 500 extracts data from the data area 610 and extracts inverted data from the index area 620.

In operation S320, the control unit 300 determines whether the extracted data and the extracted inverted data satisfy a predetermined condition.

In detail, the extracted data and the extracted inverted data are expected to have logically opposite values. Therefore, if the extracted data has a logic value of 1, the control unit 300 determines whether the extracted inverted data has a logic value of 0. If the extracted data has a logic value of 0, the control unit 300 determines whether the extracted inverted data has a logic value of 1.

If the extracted data and the extracted inverted data are determined to have logically opposite values in operation S320, the control unit 300 determines the extracted data to be valid in operation S330.

However, if the extracted data and the extracted inverted data are determined not to have logically opposite values in operation S320, the control unit 300 determines the extracted data to be invalid in operation S340. The determining of the validity of data written to a flash memory is carried out by taking advantage of the physical characteristics of a flash memory, these being that, in a write operation, a logic value of 0 is converted into a logic value of 1, but not vice versa, while, in an erase operation, a logic value of 0 is converted into a logic value of 1, but not vice versa.

Figure 13:
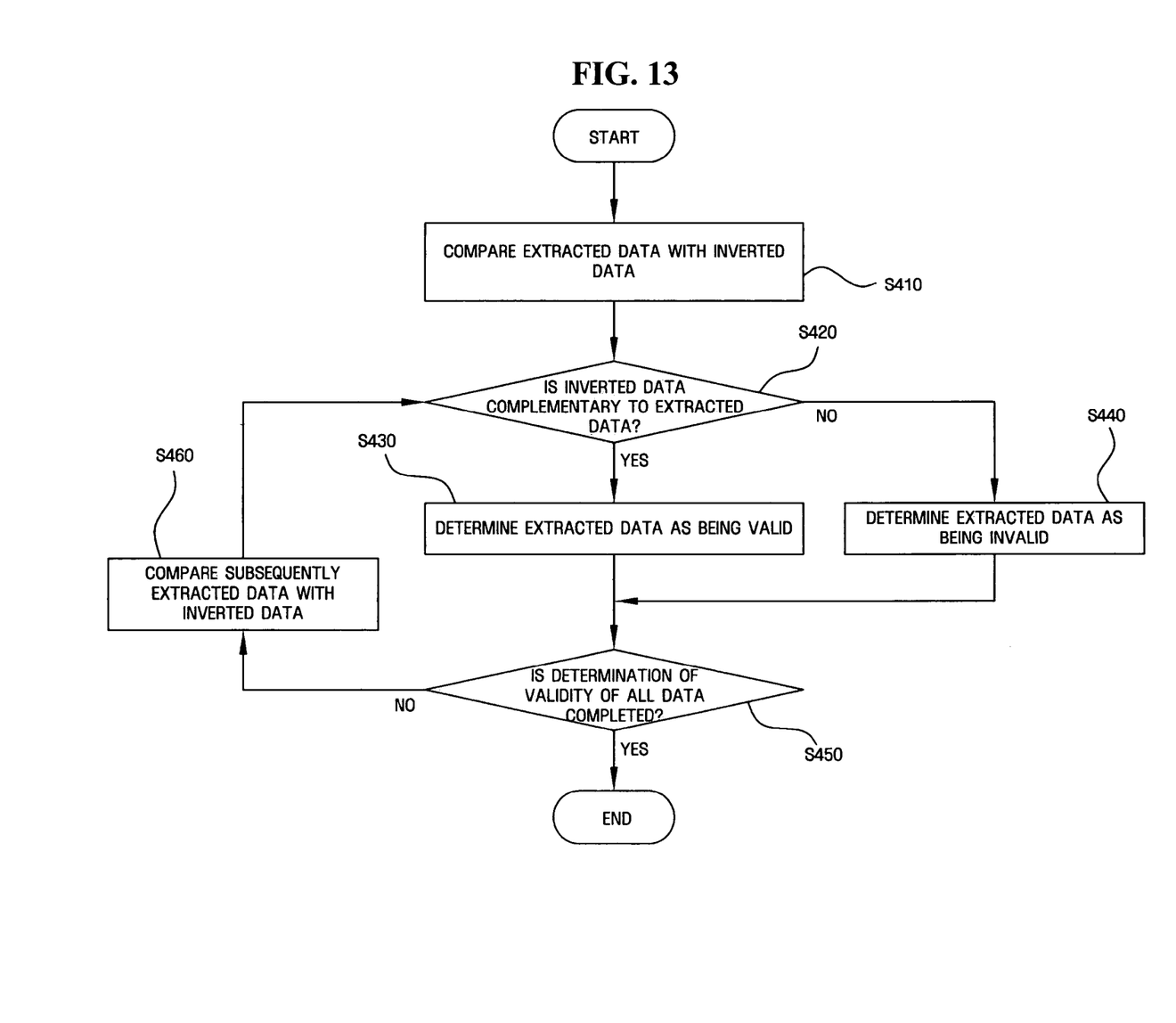
FIG. 13 is a flowchart illustrating a method of determining whether data written to a data area of a flash memory is valid according to an exemplary embodiment of the present invention, in which it is determined whether the data written to the data area of the flash memory is valid by comparing the data written to the data area of the flash memory with inverted data written to an index area of the flash memory.

FIG. 13 is a flowchart illustrating a method of determining whether data written to a flash memory is valid based on the relationship between data extracted from a data area of the flash memory and inverted data extracted from an index area of the flash memory as mentioned above with reference to FIG. 12.

Referring to FIG. 13, in operation S410, extracted data and extracted inverted data corresponding to the extracted data are compared with each other.

In operation S420, it is determined whether the extracted inverted data is complementary to the extracted data. If the extracted inverted data is determined to be complementary to the extracted data in operation S420, the extracted data is determined to be valid in operation S430. Otherwise, the extracted data is determined to be invalid in operation S440.

In operation S450, it is determined whether the determination of the validity of all data is completed. If the determination of the validity of all of the data is not completed, subsequently extracted data and extracted inverted data corresponding to the subsequently extracted data are compared with each other in operation S460.

Then, the method returns to operation S420 so that operations S420 through 440 are repeated until the determination of the validity of all of the data is completed.

The method as illustrated in FIG. 13 may be applied not only to a write operation but also to an erase operation.

In detail, in the case of performing an erase operation on a flash memory, a logic value of 0 may be converted into a logic value of 1, but not vice versa. Therefore, inverted data for a logic value of 1 may be recorded in the index area 620.

Accordingly, the control unit 300 may determine whether the erase operation is a normal erase operation or an abnormal erase operation based on the relationship between the data recorded in the data area 610 and the data recorded in the index area 620. If the erase operation is determined to be an abnormal erase operation, the control unit 300 may also determine whether the abnormally erased data is valid or not.

As described above, according to the present invention, it is possible to easily determine whether data stored in a flash memory is valid by recording inverted data of data written to a logical area in an index area corresponding to the logical area whenever a data operation is carried out. In addition, it is possible to enhance the performance of a flash memory by simplifying processes for determining the validity of data stored in the flash memory.

Although the data processing apparatus and method for a flash memory according to the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. A data processing apparatus for a flash memory, the data processing apparatus comprising:
    a user request unit which issues a request for performing a data operation on a predetermined logical address;
    a conversion unit which converts the predetermined logical address into a physical address; and
    a control unit which performs the data operation on the physical address and records inverted data of data written to the predetermined logical address in an index area, wherein the inverted data is used to determine whether the data written to the predetermined logical address is valid.

2. The data processing apparatus of claim 1, wherein the inverted data is logically opposite to the data written to the predetermined logical address.

3. A data processing apparatus for a flash memory, the data processing apparatus comprising:
    an extraction unit which extracts data from a predetermined logical address and extracts data from an index area corresponding to the predetermined logical address, wherein the data extracted from the index area is used to determine whether the data extracted from the predetermined logical address is valid; and
    a control unit which determines whether the data extracted from the predetermined logical address is valid based on a relationship between the data extracted from the predetermined logical address and the data extracted from the index area.

4. The data processing apparatus of claim 3, wherein the control unit determines the data extracted from the predetermined logical address to be valid if the data extracted from the index area is inverted with respect to data extracted from the predetermined logical address.

5. The data processing apparatus of claim 4, wherein the data extracted from the index area is logically opposite to the data extracted from the predetermined logical address.

6. A data processing method for a flash memory, the data processing method comprising:
    issuing a request for performing a data operation at a predetermined logical address;
    converting the predetermined logical address into a physical address; and
    performing the data operation at the physical address and recording inverted data of data written to the predetermined logical address in an index area, wherein the inverted data is used to determined whether the data written to the predetermined logical address is valid.

7. The data processing method of claim 6, wherein the inverted data is logically opposite to the data written to the predetermined logical address.

8. A data processing method for a flash memory, the data processing method comprising:
    extracting data from a predetermined logical address and extracting data from an index area corresponding to the predetermined logical address, wherein the data extracted from the index area is used to determine whether the data extracted from the predetermined logical address is valid; and
    determining whether the data extracted from the predetermined logical address is valid based on a relationship between the data extracted from the predetermined logical address and the data extracted from the index area.

9. The data processing method of claim 8, wherein the determining comprises: comparing the data extracted from the predetermined logical address with the data extracted from the index area; and
    determining the data extracted from the predetermined logical address to be valid if the data extracted from the index area is inverted with respect to the data extracted from the predetermined logical address.

10. The data processing apparatus of claim 9, wherein the data extracted from the index area is logically opposite to the data extracted from the predetermined logical address.

* * * * *